Patented Jan. 31, 1928.

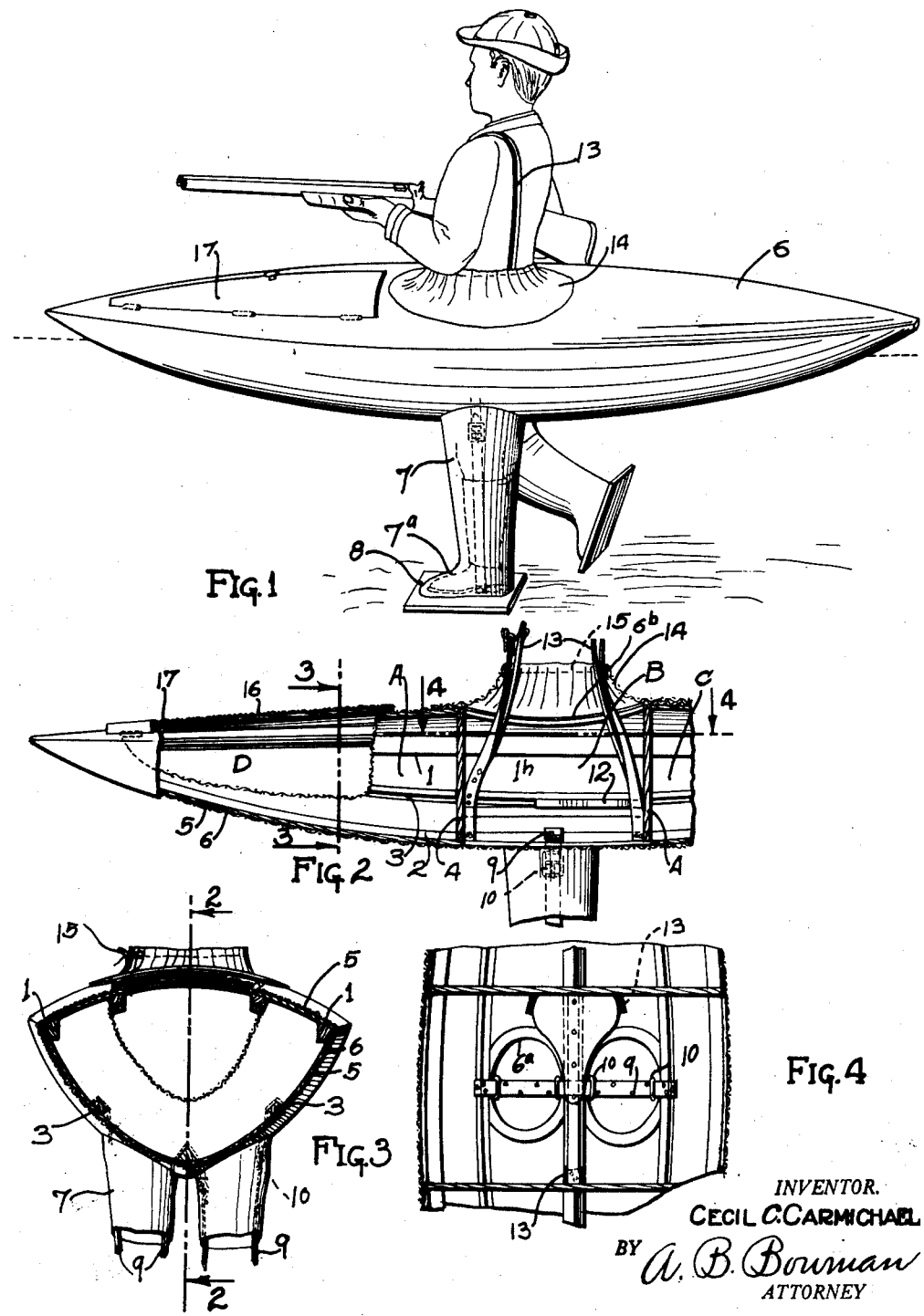

1,657,786

UNITED STATES PATENT OFFICE.

CECIL C. CARMICHAEL, OF SAN DIEGO, CALIFORNIA.

HUNTING BOAT.

Application filed May 20, 1926. Serial No. 110,315.

My invention relates to hunting boats more particularly adapted for hunting ducks or other water fowl.

The objects of my invention are: first, to provide a boat of this class whereby a hunter may go into deep or shallow water, or into swamps, and readily propel himself therethrough; second, to provide a boat structure of this class which is very light of construction and forms a part of the paraphernalia of the hunter or other person, permitting him to readily carry the same without effort and without the use of his hands on dry land or through shallow water and muddy places; third, to provide a boat structure of this class having a light hull and provided in its bottom with leg holes through which the legs of the hunter are adapted to extend for propelling himself through water by his feet; fourth, to provide a boat structure of this class having leg holes in its bottom and flexible, watertight, leg-receiving sleeves connected with the holes for receiving the legs of the hunter whereby he may propel himself in the boat with his legs and at the same time keep his legs dry; fifth, to provide a boat structure of this class having in its bottom and intermediate its ends, depending, flexible, leg-receiving sleeves provided at their lower ends with relatively large plates which are adapted to serve as paddles whereby the operator may propel himself through water and whereby the operator may walk through muddy places without sinking into the mud to any great extent; sixth, to provide a boat structure of this class which is supported on the shoulders of the operator so that he may carry the boat structure on dry land or through shallow water and still have the free use of his hands for manipulating a gun; seventh, to provide a boat structure of this class in which the waterproof, flexible, leg-receiving sleeves, extending below the bottom of the hull, may be easily adjusted to accommodate different persons and whereby the strain on the flexible, leg enclosing sleeves is eliminated; eighth, to provide a boat structure of this class having a plurality of separate, enclosed, watertight compartments; ninth, to provide a boat structure of this class in which the upper portion of the operator's compartment may be tightly laced around the waist of the operator; tenth, to provide a boat structure of this class having a storage compartment directly in front of the operator's compartment and readily accessible by the operator for carrying a gun, paddle, game, ammunition and the like; eleventh, to provide as a whole a novelly constructed boat structure of this class, and twelfth, to provide a boat structure of this class which is particularly simple and economical of construction, durable, and which will not readily deteriorate or get out of order.

With these and other objects in view, as will appear hereinafter, my invention consists of certain novel features of construction, combination and arrangement of parts and portions, as will be hereinafter described in detail and particularly set forth in the appended claims, reference being had to the accompanying drawings and to the characters of reference thereon, which form a part of this application, in which:

Figure 1 is a perspective view of my hunting boat in one form of construction, showing a hunter in the operator's compartment thereof and carrying the boat on dry land; Fig. 2 is an enlarged fragmentary longitudinal sectional view thereof, taken through 2—2 of Fig. 3, showing certain parts and portions in elevation to facilitate the illustration; Fig. 3 is a transverse sectional view thereof on an enlarged scale, taken through 3—3 of Fig. 2, and Fig. 4 is a fragmentary sectional view thereof in plan, taken through 4—4 of Fig. 2.

Like characters of reference refer to similar parts and portions throughout the several views of the drawings.

The hull of my boat structure is in the form of a shell or skiff with transversely and longitudinally curved bottom, pointed bow and stern, and covered at the top side with a transversely curved, convex deck except for a small opening at the middle portion to admit the operator.

The frame of the hull of my boat structure consists of a pair of curved side ribs 1, a curved keel rib 2 and curved ribs 3 positioned intermediate the side and keel ribs, said ribs extending from bow to stern and secured together at said bow and stern in the form of relatively sharp points, as shown in Figs. 1 and 2. These longitudinal ribs are held apart or braced relative to one another at the middle portion of the hull by means of two spaced apart, watertight, transverse bulkheads or partitions 4. These partitions or bulkheads divide the hull into three watertight compartments, namely, the fore compartment A, the intermediate or operator's compartment B and the aft compartment C.

The bottom and side walls, as well as the top side or deck portion of the compartments A and C of the hull, are covered by a thin wood veneer 5, giving a rigid construction to the fore and aft portions of the hull as well as smooth, curved outline thereto. The veneer is covered by treated, heavy weight canvas 6, said canvas extending over the bottom side and top portions of the middle compartment B, thus forming three watertight compartments and a flexible wall, operator's compartment, the canvas in the operator's compartment being secured directly to the ribs previously described.

In the bottom portion of the canvas 6 in the operator's compartment B is provided a pair of leg openings 6ª. To the bottom of the middle portion of the hull and over the leg openings 6ª therein are secured the upper open ends of flexible leg-receiving sleeves or boots 7, which are provided at their lower ends with foot portions 7ª. These leg-receiving sleeves are made of waterproof canvas or other suitable material so that the same may be readily shifted by the legs of the operator for carrying the boat or guiding the same through the water. At the lower ends of the foot portions of the sleeves 7 are secured plates 8 made preferably of fiber or other strong light material. These plates are adapted for paddling the boat through the water and also for preventing the operator from sinking into mud when carrying the boat thereover. To prevent unnecessary strain on the fabric of the leg-receiving sleeves 7 and on the fabric forming the outer wall of the middle compartment B to which the sleeves are secured, I have provided straps 9, which are secured to the keel rib 2 and the intermediate side ribs 3, and extend downwardly into the sleeves 7. Said straps are secured at their lower ends to the blocks 8 providing a strong connection between the lower ends of the sleeves and the frame of the hull. These straps are provided with buckles 10 intermediate their ends so that the straps may be readily adjusted for different operators.

Within the operator's compartment B of the hull is provided a longitudinal brace 11, which is positioned above the keel rib and supported on the bulkheads or partitions 4. On the rear portion of said brace is provided a small seat 12 for supporting the hunter or other operator when propelling the boat through the water by the feet, it being noted that the operator straddles the brace and seat, 11 and 12, respectively, as when operating a bicycle, the legs being permitted to be moved back and forth, up and down and tilted angularly for propelling the boat.

When carrying the boat structure over land or in shallow water, the same is supported from the shoulders of the hunter or other operator by straps 13, shown in Figs. 1 and 2, which straps are adjustable for accommodating persons of different heights. The ends of the straps extend from the shoulders of the person carrying the boat into the operator's compartment B, and are secured at their ends to the keel rib 2, either as a single strap at the lower ends or as separate straps.

In the middle portion of the upper side of the operator's compartment of the hull is provided a large opening 6ᵇ for admitting the operator. To the upper side of the hull, around the opening 6ᵇ, is secured, in any convenient manner, a flexible skirt portion 14, which is also provided with an opening at its middle portion and shirred around the opening by a cord 15 so that the skirt portion 14 may be pulled tightly around the waist of the hunter or other operator.

It will be here noted that the operator is so positioned within the hull that his weight is concentrated below the center of gravity or buoyancy of the hull so that the boat is stable when in operation in the water.

In the deck or upper side wall of the fore part of the hull is provided a large opening to a storage compartment D, which is formed of canvas or other fabric or flexible material 16 secured at its upper edges to the veneer body 5 of the hull or to ribs shown in Fig. 3. This compartment may be of any size desired for carrying a gun, paddle, game and the like and is preferably covered by a large veneer reinforced canvas cover 17 conforming in shape with the deck of the hull and somewhat larger than the opening therein.

Though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

Having thus described my invention, what I claim as new and desire to secure by Letters Patent is:

1. In a boat structure, a hull having leg holes through its bottom, flexible leg-receiving sleeves connected with said holes and extending below said hull for receiving the legs of a person, and adjustable straps secured to the hull and to the lower ends of said sleeves.

2. In a boat structure, a hull having leg holes through its bottom, flexible leg-receiving sleeves connected with said holes and extending below said hull for receiving the legs of a person, adjustable straps secured to the hull and to the lower ends of said sleeves, and shoulder straps secured to the hull adapted to extend over a person for supporting the hull on the person.

3. In a boat structure of the class described, a relatively long hull divided longitudinally into fore and aft watertight compartments and having an intermediate operator's compartment, said operator's compartment having leg holes through its bottom portion.

4. In a boat structure of the class described, a hull having fore and aft watertight compartments and having an intermediate operator's compartment, said operator's compartment having leg holes through its bottom portion, and leg receiving sleeves depending from said intermediate compartment and communicating therewith through the openings in the bottom portion thereof adapted to receive the legs of the operator of the boat.

5. In a boat structure of the class described, a hull having fore and aft watertight compartments and having an intermediate operator's compartment, said operator's compartment having leg holes through its bottom portion, said intermediate compartment having a large opening at its upper side for admitting the operator of the boat, and a flexible skirt positioned over said large opening and provided with a drawstring at its upper end for securing said skirt about the waist portion of the operator.

6. In a boat structure of the class described, a hull having fore and aft watertight compartments and having an intermediate operator's compartment, said operator's compartment having leg holes through its bottom portion, said fore compartment having a storage compartment and a cover therefor accessible from the intermediate compartment of the hull.

7. In a boat structure of the class described, a hull having fore and aft watertight compartments and having an intermediate operator's compartment, said operator's compartment having leg holes through its bottom portion, said intermediate compartment having a large opening at its upper side for admitting the operator of the boat, a flexible skirt positioned over said large opening and provided with a draw-string at its upper end for securing said skirt about the waist portion of the operator, said fore compartment having a storage compartment, the fore part of said covering having an opening permitting access to said storage compartment, and a door for said last mentioned opening conforming in shape with said covering.

In testimony whereof, I have hereunto set my hand at San Diego, California, this 11th day of May, 1926.

CECIL C. CARMICHAEL.